Oct. 4, 1960

L. F. LYONS ET AL 2,955,243

A.C. TO D.C. POWER SUPPLY VARIABLE AS
TO POLARITY AND MAGNITUDE

Filed April 14, 1958

L. F. Lyons
L. W. Moede
INVENTORS

BY

ATTORNEY

United States Patent Office 2,955,243
Patented Oct. 4, 1960

2,955,243

A.C. TO D.C. POWER SUPPLY VARIABLE AS TO POLARITY AND MAGNITUDE

Lambert F. Lyons, San Fernando, and Larry W. Moede, Burbank, Calif., assignors to The Bendix Corporation, a corporation of Delaware Filed Apr. 14, 1958, Ser. No. 728,435

6 Claims. (Cl. 318—293)

This invention relates to systems for supplying direct current power from an A.C. source and varying the polarity and magnitude of the output in accordance with the polarity and magnitude of a low power direct control current. More specifically, it relates to such systems employing magnetic amplifiers as control elements. Systems of this type are particularly useful for selectively driving a D.C. reversible motor of substantial power in either direction in response to relatively weak D.C. signals.

An object of the invention is to provide an efficient, magnetic-amplifier-controlled, A.C. to D.C. power-converting system.

Another object is to provide such a system having low idle power consumption.

Magnetic amplifiers are well adapted for D.C. control of A.C. power, but previously known magnetic amplifier circuits for controlling reversible motors powered from an A.C. source have required ballast or dummy load resistors in which most of the power was dissipated, and their theoretical maximum efficiency is less than 17%. The present invention eliminates ballast resistors and has a realizable efficiency of 50%. Furthermore, whereas the prior systems consumed substantial power even when the motor was idle (not running), the idle power consumption of the present system is extremely low.

A full understanding of the invention may be had from the following description with reference to the drawing, in which.

Figure 1:
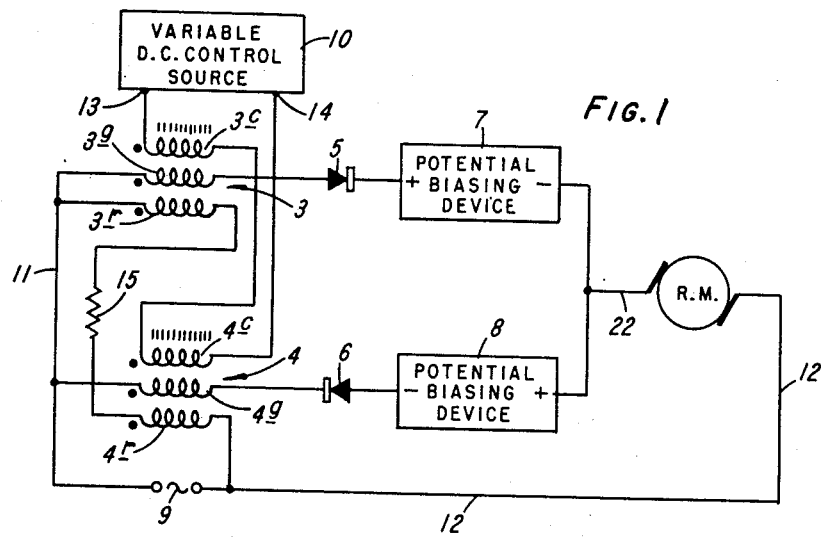
Fig. 1 is a schematic diagram of a system in accordance with the invention.

Fig. 1 shows a circuit for variably energizing a reversible D.C. motor RM from an A.C. power source 9 to run in either direction according to the polarity of a direct control current supplied by a D.C. control source 10. The circuit comprises a saturable core magnetic amplifier 3, half wave rectifier 5, and potential biasing device 7, for deriving from the source 9 pulses of one polarity for application to the motor RM, and a saturable core magnetic amplifier 4, half wave rectifier 6, and potential biasing device 8, for applying pulses of the opposite polarity to the motor RM.

The magnetic amplifier 3 has a gate winding 3g connected between one A.C. line 11 and the rectifier 5, a control winding 3c energized from the source 10, and a reset winding 3r permanently connected between the A.C. lines 11 and 12. The magnetic amplifier 4 has three corresponding windings 4g, 4c and 4r. The gate winding 4g is connected between the A.C. line 11 and the rectifier 6; the control winding 4c is connected in series with the control winding 3c; and the reset winding 4r is connected in series with the winding 3r. A resistor 15 may be included in series with the reset windings 3r and 4r to adjust the current in the reset windings. It will be observed that the connections are such that the polarity of the current in any winding of the magnetic amplifier 3 at any instant is identical with that in the corresponding winding in the magnetic amplifier 4. However, the two half-wave rectifiers 5 and 6 are oppositely poled so that they are respectively conductive on positive and negative half-cycles. Each potential-biasing device 7 and 8 is poled to oppose potential applied thereto through its associated rectifier 5 or 6. The operation of the circuit will now be explained under the conditions when no control potential is applied by the source 10, and when control potential is applied by the source 10, respectively.

*No control current*

When the control windings 3c and 4c are not energized, small positive and negative pulses of equal magnitude may be alternately delivered to the motor RM through the gate windings 3g and 4g. There is no net D.C. component, and the motor remains stationary. The pulses are small, because the magnetic amplifiers 3 and 4 do not saturate to reduce the impedance of the gate windings 3g and 4g until late in each half cycle. Magnetic amplifier 3 is saturated in each positive half cycle by forward (the direction of conduction of the rectifier 5) current flow in both windings 3g and 3r, and is reset in each negative half cycle by reverse current flow in the reset winding 3r only. It is to be noted at this point that during a negative half cycle, increasing current in the reset winding 3r induces a forward potential in the winding 3g, but this induced potential is opposed, at the rectifier 5, by substantially the full line voltage on line 12 which is applied through the motor and through the voltage-biasing device 7.

The magnetic amplifier 4, rectifier 6, and potential-biasing means 8 function similarly to transmit small negative pulses to the motor.

*With control current*

When the source 10 renders terminal 13 positive with respect to terminal 14, the positive pulses delivered through rectifier 5 exceed in magnitude the negative pulses through rectifier 6, because the current in the control winding 3c is in aiding relation to the current in the gate winding 3g during positive half cycles, whereas the current in the control winding 4c is in opposing relation to the current in the gate winding 4g during negative half cycles. The aiding control current in the control winding 3c causes the magnetic amplifier 3 to saturate earlier in the cycle and hence pass a longer current pulse, whereas the opposing current in winding 4c causes the magnetic amplifier 4 to saturate later than it otherwise would, and pass a smaller current pulse.

As a result of the disparity in the pulses applied through the rectifiers 5 and 6, respectively, a direct current component is applied to the motor RM, causing it to rotate in one direction and develop a continuous back E.M.F. which, in this instance, biases the line 22 positive with respect to the line 12 and would prevent the resetting of the magnetic amplifier 4 if it were not for the voltage-biasing device 8. Alternatively, when the control terminal 14 is driven positive with respect to the terminal 13 to drive the motor in reverse direction, the voltage-biasing device 7 enables the resetting of the magnetic amplifier 3.

Considering in detail the condition when the control terminal 13 is more positive than the terminal 14:

During each half cycle when the line 11 is positive with respect to the line 12, the magnetic amplifier 3 saturates early in the cycle, because the positive potential applied to the gate winding 3g and the reset winding 3r is aided by the current in the control winding 3c. Following saturation, a positive current pulse is delivered through the rectifier 5, because the line voltage exceeds the sum of the back E.M.F. of the motor and the biasing voltage of the device 7.

During the succeeding half cycle, when the line 11 is negative with respect to the line 12, the magnetic amplifier 3 is reset by reverse current in the reset winding 3r. This reverse current in the reset winding induces an opposite potential in the gate winding 3g, but no current can flow in the latter, because the induced potential cannot exceed the line potential, and the conductor 22 is even more positive than the line 12 because of the back E.M.F. of the motor.

Considering now the operation of the magnetic amplifier 4 when the control source 10 is rendering terminal 13 positive relative to terminal 14:

During the half cycle while line 11 is positive, the magnetic amplifier 4 must be reset positive (to prepare it for the next negative cycle) by the aiding currents in the reset and control windings alone, since positive current through the gate winding is blocked by the rectifier 6. In order for the control and reset windings to accomplish this, they must not be opposed by an opposite current (in the conductive direction of rectifier 6) in the gate winding 4g. A potential in the winding 4g tending to produce such an opposite current is induced by the rising current in the reset winding 4r. Such an opposite current is aided by the back E.M.F. of the motor RM, but is opposed by the voltage-biasing means 8. By making the biasing potential of means 8 approximately equal to the maximum back E.M.F. of the motor 2, the back E.M.F. is prevented from interfering with positive resetting of magnetic amplifier 4 during the conductive half cycle of magnetic amplifier 3.

During the alternate half cycle when line 11 goes negative and line 12 goes positive, the magnetic amplifier 4 must be reset late in the half cycle to reduce the negative pulse applied to the motor relative to the positive pulse applied thereto through the rectifier 5. This is facilitated by the voltage-biasing means 8, since it opposes the back E.M.F. of the motor in the conducting direction of the rectifier 6.

Thus, without the means 8, the back E.M.F. of the motor 2 would be impressed through the rectifier 6 on the gate winding 4g in series-aiding relation with the line potential and in opposition to the direct current in the control winding 4c. This excess potential on the gate winding 4g, aided by the normal reset potential on the reset winding 4r, would more or less nullify the desired effect of the positive control current in the control winding 4c, which is to delay saturation of the magnetic amplifier 4 and thereby shorten the period during which gate winding 4g is conductive. However, the biasing potential applied to the winding 4g by the means 8 aids the control potential applied to winding 4c in delaying saturation of the magnetic amplifier 4 and reducing the negative current pulse through rectifier 6 relative to the positive pulse through the rectifier 5.

Obviously, the conditions are reversed when the control terminal 13 is positive relative to the terminal 14, the voltage-biasing means 7 then functioning to facilitate the resetting of the magnetic amplifier 3 during negative half cycles and delay the resetting during positive half cycles.

Figure 2:
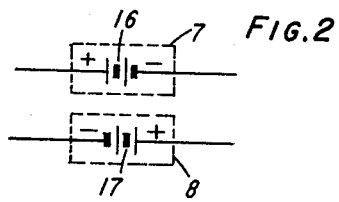
Fig. 2 is a schematic diagram illustrating one type of potential-biasing device that may be employed in the system of Fig. 1.
Figure 3:
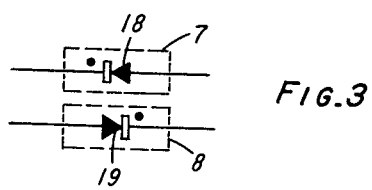
Fig. 3 is a schematic diagram showing another type of potential-biasing device that may be employed in the system of Fig. 1.

As shown in Fig. 2, each voltage-biasing means 7 or 8 may comprise a battery 16 or 17. Alternatively, as shown in Fig. 3, each voltage-biasing means may comprise a well known Zener diode 18 and 19, respectively. These diodes have high back resistance to potentials below a definite value, but above that value they become conductive to maintain a substantially constant potential drop. They have high conductivity in the forward direction. Obviously, the Zener diodes have practical advantages over batteries, in many instances.

In order for a saturable reactor to be completely reset, it must have applied thereto the same voltage integral during the "off" half cycle that it has had to absorb during the "on" half cycle. This condition is met when the biasing potential of devices 7 and 8 is approximately 1.15 times the back E.M.F. of the motor, and the A.C. line voltage across the line conductors 11 and 12 is approximately 3.3 times the back E.M.F. of the motor.

Figure 4:
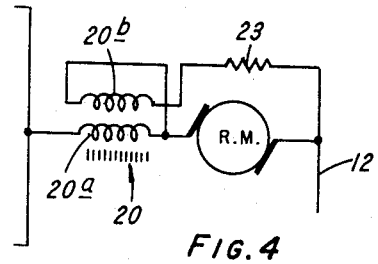
Fig. 4 is a schematic diagram showing a modification of a portion of the circuit of Fig. 1.

By adjusting the current in the reset windings 3r and 4r, as by proper choice of the value of resistor 15, the magnitude of the small pulses delivered when the control current is zero may be adjusted to a very low value. Even though they are not of extremely low value, as long as they are equal they do not drive the motor, because of their rapid successive occurrence, but waste power and may produce noise. Fig. 4 shows a modification of Fig. 1 for substantially eliminating idle current in the motor, even though positive and negative pulses are alternately applied thereto. This improves the performance by enabling the biasing of the magnetic amplifiers partly on at idle without power waste. Performance is improved because the bias adjustment is less critical, there is less drift, and a sharper null of control voltage vs. load voltage is obtained.

The modification of Fig. 4 involves the introduction into the circuit of Fig. 1 of a saturable reactor 20 having two windings 20a and 20b. The winding 20a is connected in series with the motor, and the winding 20b is connected in shunt with the motor and so poled that the back E.M.F. of the motor produces a current in the winding 20b in aiding relation to the current in the winding 20a. A current-limiting resistor 23 may be connected in series with the winding 20b to prevent excessive current flow therein when the reactor 20 saturates. When equal positive and negative pulses are alternately applied to the series circuit, consisting of the winding 9a and the motor RM, the reactor 9 does not saturate, and offers a high impedance effectively blocking the pulses from the motor. When the positive and negative pulses are not equal, a D.C. component flows through the motor and the winding 20a, which offers a low impedance to direct current. At the same time, the back E.M.F. of the motor builds up and develops a current in the winding 20b in aiding relation to the current in winding 20a, so that the reactor 20 quickly saturates and offers negligible resistance to the flow of energizing current.

Although for the purpose of explaining the invention a particular embodiment thereof has been shown and described, obvious modifications will occur to a person skilled in the art, and we do not desire to be limited to the exact details shown and described.

We claim:

1. Apparatus for variably energizing a load with direct current of either polarity from an A.C. source comprising: first and second magnetic amplifiers, each having a saturable core, a gate winding, a reset winding, and a D.C. control winding; a pair of half wave rectifiers; a pair of current-conducting, voltage-biasing means; means for variably energizing said control windings with direct current to bias the flux in said cores and thereby reduce the effective impedance of said gate windings to A.C. half waves of one polarity and increase their effective impedance to half waves of the other polarity; means connecting one gate winding, rectifier and voltage-biasing means in series in one path, with the rectifier and biasing means in opposing relation; means connecting the other gate winding, rectifier and voltage-biasing means in series in another path, with the rectifier and biasing means in opposing relation to each other; means connecting said two paths in parallel to each other and in closed series circuit with said A.C. source and load, the rectifier and biasing means in one said path being oppositely poled with respect to the rectifier and biasing means in the other path; and means connecting each reset winding to said source for energization thereby with said gate and reset windings of each magnetic amplifier poled in aiding relation to each other.

2. Apparatus according to claim 1 in which said voltage-biasing means each comprises a Zener diode.

3. Apparatus according to claim 1 in which said load is of a type developing a continuing back E.M.F. in response to pulse excitation thereof.

4. Apparatus according to claim 1 in which said load is a D.C. motor operable in either direction according to the polarity of energization.

5. In combination, a D.C. motor operable in either direction according to the polarity of energization; energizing means for applying to said motor alternate pulses of opposite polarity; means for varying the magnitude of the pulses of one polarity relative to the pulses of the other polarity to produce a D.C. component to drive said motor in one direction or the other; a saturable core reactor having a winding connected in series between said motor and said energizing means for offering a high impedance to alternating pulses and a lower impedance to said D.C. component.

6. Apparatus according to claim 5 including a second winding connected in shunt to said motor for aiding said series winding in proportion to the back E.M.F. of said motor.

References Cited in the file of this patent
UNITED STATES PATENTS

| | | |
|---|---|---|
| 2,558,094 | King | June 26, 1951 |
| 2,715,203 | Morgan | Aug. 9, 1955 |